United States Patent
Bauerle et al.

(10) Patent No.: US 8,225,646 B2
(45) Date of Patent: Jul. 24, 2012

(54) THROTTLE BODY SWEEP DIAGNOSTIC SYSTEM AND METHOD

(75) Inventors: Paul A. Bauerle, Fenton, MI (US); Marco J. Gatti, Southgate, MI (US); Dean G. Sorrell, Rochester Hills, MI (US); Todar Kuzmanov, Troy, MI (US)

(73) Assignee: GM Global Technology Operations LLC

( * ) Notice: Subject to any disclaimer, the term of this patent is extended or adjusted under 35 U.S.C. 154(b) by 411 days.

(21) Appl. No.: 12/631,044

(22) Filed: Dec. 4, 2009

(65) Prior Publication Data

US 2011/0100105 A1   May 5, 2011

Related U.S. Application Data

(60) Provisional application No. 61/256,612, filed on Oct. 30, 2009.

(51) Int. Cl.
*G01M 15/02* (2006.01)

(52) U.S. Cl. ................................................ 73/114.36
(58) Field of Classification Search .............. 73/114.31, 73/114.36
See application file for complete search history.

(56) References Cited

U.S. PATENT DOCUMENTS 5,079,946 A * 1/1992 Motamedi et al. ......... 73/114.36
* cited by examiner

*Primary Examiner* — Eric S McCall

(57) ABSTRACT

A throttle diagnostic system comprises a diagnostic device comprising a throttle sweep diagnostic module that generates N throttle position commands at a first predetermined interval, wherein the N throttle position commands differ by a predetermined interval. A vehicle control system comprises a throttle body assembly that receive the N throttle position commands and a throttle diagnostic module that performs diagnostics on the throttle body assembly at a second predetermined interval that is less than the first predetermined interval.

21 Claims, 3 Drawing Sheets

THROTTLE BODY SWEEP DIAGNOSTIC SYSTEM AND METHOD

CROSS-REFERENCE TO RELATED APPLICATIONS

This application claims the benefit of U.S. Provisional Application No. 61/256,612, filed on Oct. 30, 2009. The disclosure of the above application is incorporated herein by reference in its entirety.

FIELD

The present disclosure relates to diagnostic systems and methods for engine control systems, and more particularly to diagnostic systems and methods for throttle body assemblies.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles typically include a throttle assembly that includes a throttle blade that is adjusted by a motor. A throttle position sensor senses a position of the throttle blade. In many vehicles, the throttle position of the throttle blade changes in a one-to-one relationship with changes in position of an accelerator pedal.

More recently, some vehicles employ a different control strategy in which the accelerator pedal position to throttle position mapping is not a one-to-one relationship. For example only, torque-based control systems may not have the one-to-one relationship.

In these types of systems, it is unlikely that every operating point of the throttle body may be encountered during use. If a problem with the throttle body occurs at one of the unlikely operating points, a vehicle diagnostic system and/or technician may be unable to accurately diagnose faults in the throttle body assembly.

SUMMARY

A throttle diagnostic system includes a diagnostic device comprising a throttle sweep diagnostic module that generates N throttle position commands at a first predetermined interval. The N throttle position commands differ by a predetermined interval. N is an integer greater than or equal to 25. A vehicle control system comprises a throttle body assembly that receives the N throttle position commands. A throttle diagnostic module performs diagnostics on the throttle body assembly at a second predetermined interval that is less than the first predetermined interval.

In other features, the N throttle position commands are equally spaced between a minimum throttle position and a maximum throttle position. The minimum throttle position is 0% and the maximum throttle position is 100%. The predetermined interval is 1%. The first predetermined period is between 1.25 and 1.5 times the second predetermined period. The first predetermined period is between approximately 250 and 300 ms and the second predetermined period is approximately 200 ms.

A throttle diagnostic system comprises a throttle sweep diagnostic module that sends N throttle position commands at a first predetermined interval to a throttle body assembly. The N throttle position commands differ by a predetermined interval. N is an integer greater than or equal to 25. A throttle diagnostic module performs diagnostics on the throttle body assembly at a second predetermined interval that is less than the first predetermined interval.

In other features, the N throttle position commands are equally spaced between a minimum throttle position and a maximum throttle position. The minimum throttle position is 0% and the maximum throttle position is 100%. The predetermined interval is 1%. The first predetermined period is between 1.25 and 1.5 times the second predetermined period. The first predetermined period is between approximately 250 and 300 ms and the second predetermined period is approximately 200 ms.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
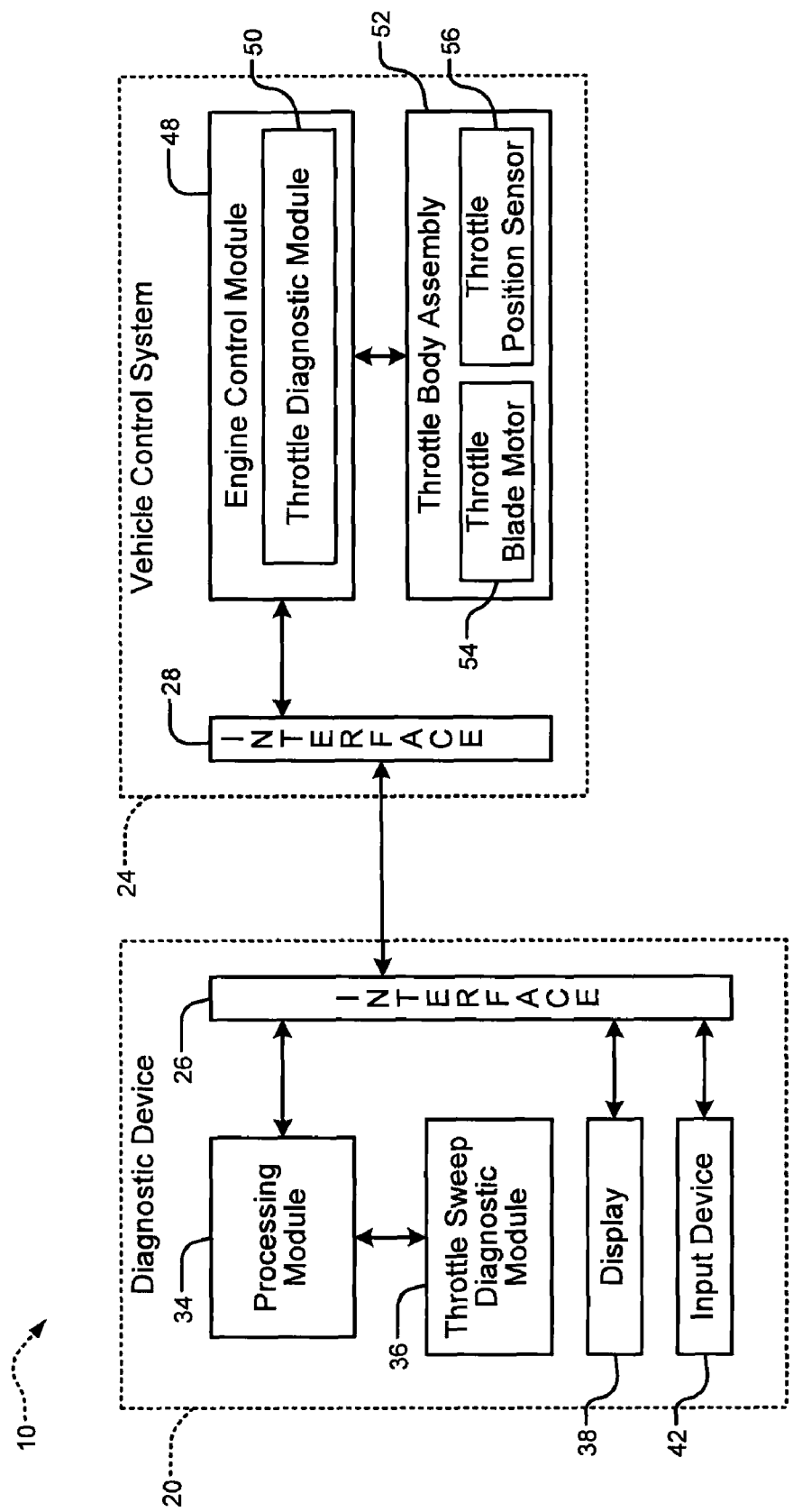
FIG. 1 is a functional block diagram of an exemplary throttle body sweep diagnostic system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Conventional throttle diagnostic tests are not typically repeatable. Some conventional throttle diagnostic tests require manual operation of the accelerator pedal. Other tests provide manual selection of course throttle increments such as 10% increments. The diagnostic system may only detect a fault if the throttle position is maintained during a diagnostic window such as 200 ms. These manual types of tests often fail to properly diagnose the fault.

A throttle sweep diagnostic system and method according to the present disclosure performs a throttle diagnostic sweep test. A vehicle control system or a diagnostic device performs the throttle diagnostic sweep test. The throttle diagnostic sweep test sweeps the throttle position from a minimum position to a maximum position (or vice versa) via predetermined throttle increments at predetermined intervals.

The throttle diagnostic sweep test leaves the throttle position at a new setting for a first predetermined period that is longer than a second predetermined period required by an on-board diagnostic system of the vehicle control system to diagnose a fault. The predetermined throttle increments are selected to be sufficiently small to identify throttle motor faults such as faults in a commutator of a motor (used to position the throttle blade) or sensor tracks of a throttle position sensor (used to sense a position of the throttle blade).

Referring now to FIG. 1, a vehicle diagnostic system 10 includes a diagnostic device 20 and a vehicle control system 24. The diagnostic device 20 includes an interface 26 that communicates with an interface 28 of the vehicle control system 24. For example only, the interfaces 26 and 28 can be On-Board Diagnostic (OBD)-complaint ports, assembly line data links (ALDLs), universal serial bus (USB) interfaces, and/or any other suitable interfaces.

The diagnostic device 20 further includes a processing module 34 that provides data and control processing. The diagnostic device 20 further includes a throttle sweep diagnostic module 36 that sends throttle position commands at predetermined intervals and checks for diagnostic codes being set as will be described further below. The diagnostic device 20 further includes a display 38 and an input device 42 such as a keyboard, touch screen and/or other suitable input device.

The vehicle control system 24 further includes a control module 48 that includes a throttle diagnostic module 50. The control module 48 may be implemented by the engine control module or any other suitable vehicle control module. The control module 48 communicates with a throttle body assembly 52 that includes a throttle blade motor 54 and a throttle position sensor 56. The commanded throttle position is sent to the throttle blade motor 54. The throttle position sensor 56 senses a position of a throttle blade (not shown).

The throttle diagnostic module 50 compares a commanded throttle position sent to the throttle blade motor 54 with an actual throttle position sensed by the throttle position sensor 56. If the difference between the commanded throttle position and the actual throttle position is outside of a predetermined range, takes too long to reach the correct position, fails to settle or fails to meet any other calibration parameter, the throttle diagnostic module 50 triggers a fault.

Typically, the throttle diagnostic module 50 performs a diagnostic routine once every predetermined period. In other words, the throttle diagnostic module 50 determines whether or not the throttle body assembly is operational or not operational once every predetermined period or within a predetermined period after a new throttle position is commanded. Each of the commanded throttle positions is set and maintained for a sufficient amount of time to allow the throttle diagnostic module to determine if a fault has occurred.

Figure 2:
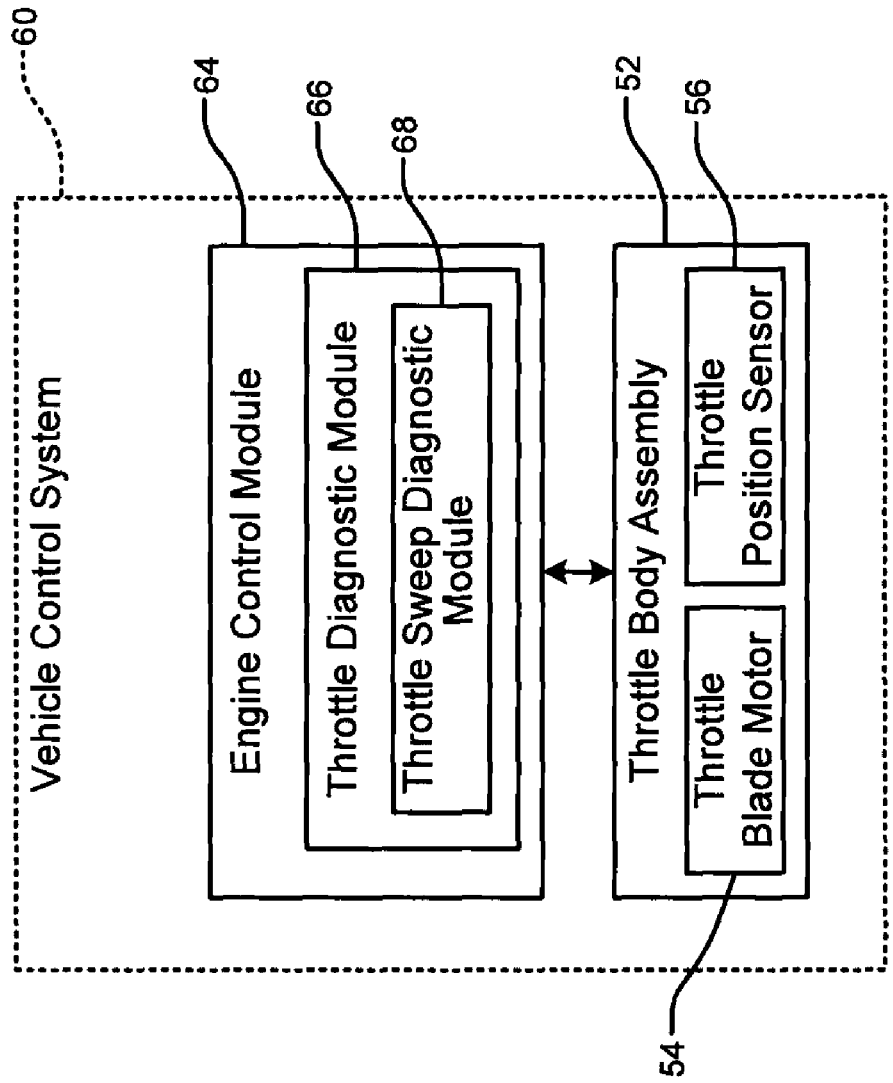
FIG. 2 is a functional block diagram of another exemplary throttle body sweep diagnostic system according to the present disclosure.

Referring now to FIG. 2, an alternate implementation of the vehicle control system 60 is shown. In FIG. 1, the commanded throttle positions are sent to the vehicle control system 24 from an external diagnostic device. In the implementation in FIG. 2, the throttle sweep diagnostic module 68 is integrated with a throttle diagnostic module 66, which may form part of the control module 64 or any other vehicle control module. The control module 64 may be an engine control module.

The throttle sweep diagnostic module 68 operates in a similar manner as described above in conjunction with FIG. 1. However, the vehicle control system 60 is able to initiate the throttle sweep test without receiving throttle commands from the external diagnostic device such as the diagnostic device in FIG. 1. In some implementations, the diagnostic device may still be used to trigger the test.

Figure 3:
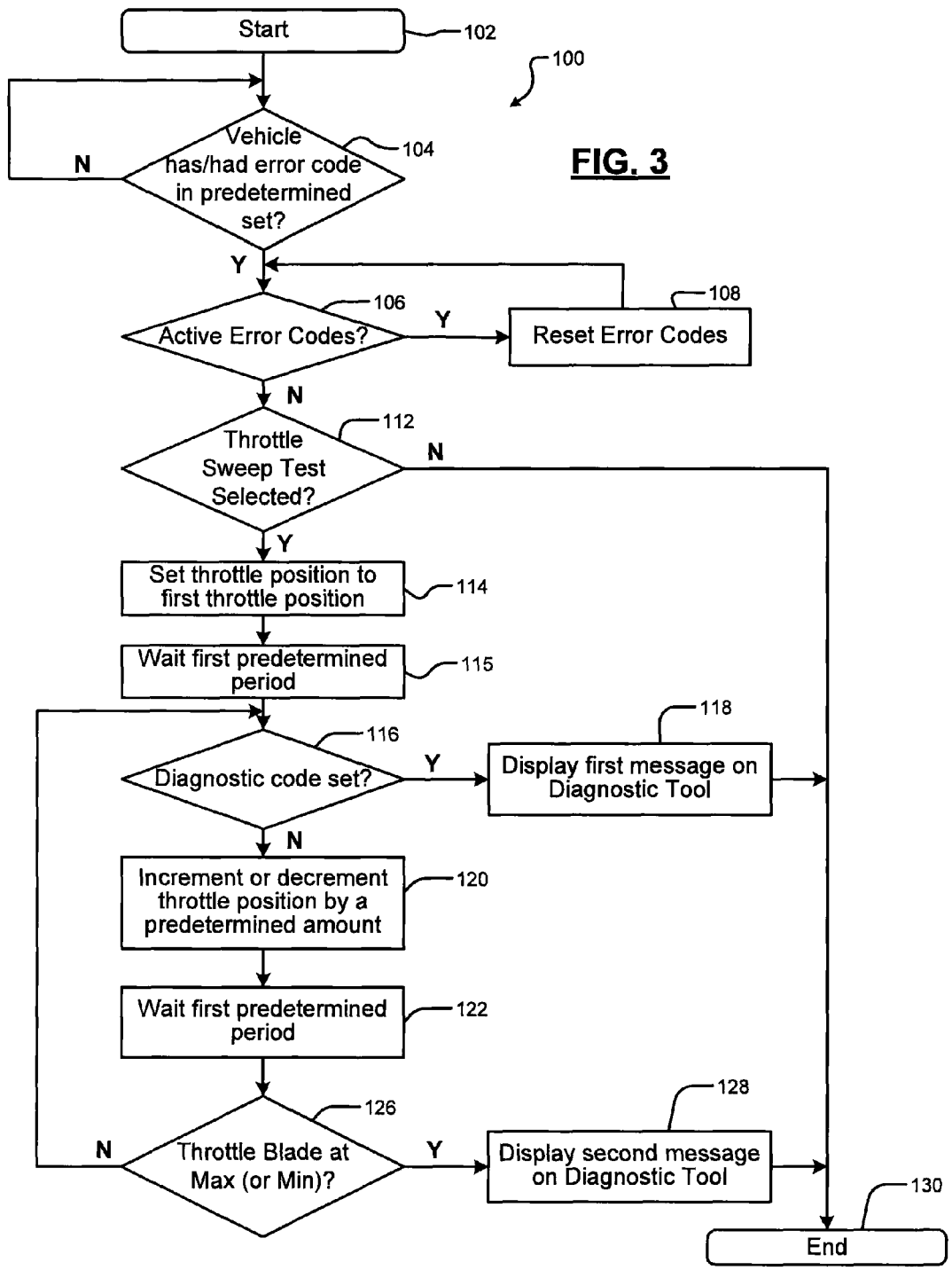
FIG. 3 illustrates steps of a method for performing a throttle body sweep diagnostic system according to the present disclosure.

Referring now to FIG. 3, the method 100 begins at 102. At 104, the method determines whether or not the vehicle has (or had) an error code in a predetermined set of error codes at 102. For example, the predetermined set of error codes may include one or more of the following OBD codes: P1516, P2101, P2119, P2135, P0122, P0123, P0222 and P0223.

If 102 is true, the method determines whether or not there are any active error codes at 104. If 104 is true, the error codes are reset at 108. If the error code was set due to faulty vehicle wiring, the error code will return immediately. Otherwise if the vehicle wiring is not faulty, the code will not return until the throttle sweep test is completed. Thus, both the vehicle wiring and other components are tested. In some implementations, a timer may be added to allow at least one diagnostic period to elapse. After the period is up, control may be used to detect the triggering of the fault before the sweep test is run and a wiring fault may be generated identifying the vehicle wiring as the source of the fault.

When 104 is false, the method continues at 112 where the method determines whether a throttle sweep test has been selected via the diagnostic device or by the vehicle control system. If 112 is false, the method ends.

If 112 is true, the throttle position is set to a first throttle position at 114. At 115, the method waits a first predetermined period. The first predetermined period may be greater than a second predetermined period that is equal to a diagnostic response time of the vehicle control system.

At 116, the method determines whether a diagnostic code has been set. For example only, the diagnostic codes may be OBD codes such as P2101 or P1516. If 116 is true, the method displays a first message on the display 38 of the diagnostic device at 118 and the method ends. For example, the first message may be a message instructing a technician to change the throttle body assembly, a fault code set on the control module of the vehicle or any other indicator.

If 116 is false, control increments (or decrements if starting from 100%) the throttle position by a predetermined amount. At 122, the method waits the first predetermined period. At 126, control determines whether the throttle blade is at a maximum (or minimum if starting from 100%) throttle position. If 126 is false, control returns to step 116. If 126 is true, control displays a second message on the diagnostic device at 128. The second diagnostic message may indicate that the throttle body sweep diagnostic test was passed and the method ends.

For example only, the throttle diagnostic sweep test sweeps the throttle from 0% to 100% at 1-4% intervals. The first predetermined period may be between 1.25 and 1.5 times the second predetermined period. For example only, each interval is performed every 250 ms to 300 ms for a total sweep time of less than 25 to 30 seconds. In this example, the on-board diagnostic system diagnoses faults within 200 ms. If there are faults on the commutator of the motor or problems with the throttle position sensor, a resolution of 1-4% is fine enough to catch this type of problem. Therefore, the test includes at least 25 intervals. The test may be run with the engine off and the ignition switch on.

If the diagnostic device is used, the test can be run without intrusion into a wire harness or throttle body of the vehicle. The test is repeatable, which allows further investigation into failed parts by a supplier of the throttle body assembly. The test uses standard tools and does not require a special adapter harness, a custom power supply or a signal generator.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A throttle diagnostic system comprising:
   a diagnostic device comprising a throttle sweep diagnostic module that generates N throttle position commands at first predetermined intervals, wherein the N throttle position commands differ by a predetermined interval, and wherein N is greater than or equal to 25; and
   a vehicle control system comprising:
      a throttle body assembly that receives the N throttle position commands; and
      a throttle diagnostic module that performs diagnostics on the throttle body assembly at a second predetermined interval that is less than the first predetermined interval.

2. The throttle diagnostic system of claim 1, wherein the N throttle position commands are equally spaced between a minimum throttle position and a maximum throttle position.

3. The throttle diagnostic system of claim 2, wherein the minimum throttle position is 0% and the maximum throttle position is 100%.

4. The throttle diagnostic system of claim 1, wherein the predetermined interval is 1%.

5. The throttle diagnostic system of claim 1, wherein the first predetermined interval is between 1.25 and 1.5 times the second predetermined interval.

6. The throttle diagnostic system of claim 1, wherein the first predetermined interval is between 250 and 300 ms and the second predetermined interval is 200 ms.

7. The throttle diagnostic system of claim 1, wherein the diagnostic device resets at least one fault code prior to throttle sweep testing, and generates a wiring fault when the at least one fault code is generated again before the throttle sweep testing begins.

8. A throttle diagnostic system comprising:
   a throttle sweep diagnostic module that sends N throttle position commands at first predetermined intervals to a throttle body assembly, wherein the N throttle position commands differ by a predetermined interval and wherein N is greater than or equal to 25; and
   a throttle diagnostic module that performs diagnostics on the throttle body assembly at a second predetermined interval that is less than the first predetermined interval.

9. The throttle diagnostic system of claim 8, wherein the N throttle position commands are equally spaced between a minimum throttle position and a maximum throttle position.

10. The throttle diagnostic system of claim 9, wherein the minimum throttle position is 0% and the maximum throttle position is 100%.

11. The throttle diagnostic system of claim 8, wherein the predetermined interval is 1%.

12. The throttle diagnostic system of claim 8, wherein the first predetermined interval is between 1.25 and 1.5 times the second predetermined interval.

13. The throttle diagnostic system of claim 8, wherein the first predetermined interval is between 250 and 300 ms and the second predetermined interval is 200 ms.

14. The throttle diagnostic system of claim 8, wherein the throttle sweep diagnostic module resets at least one fault code prior to throttle sweep testing, and generates a wiring fault when the at least one fault code is generated again before the throttle sweep testing begins.

15. A throttle diagnostic method comprising:
   generating N throttle position commands at first predetermined intervals, wherein the N throttle position commands differ by a predetermined interval and wherein N is greater than or equal to 25;
   maintaining each the N throttle position commands during each of the corresponding ones of the first predetermined intervals;
   receiving the N throttle position commands at a throttle body assembly; and
   performing diagnostics on the throttle body assembly at a second predetermined interval that is less than the first predetermined interval.

16. The method of claim 15, wherein the N throttle position commands are equally spaced between a minimum throttle position and a maximum throttle position.

17. The method of claim 16, wherein the minimum throttle position is 0% and the maximum throttle position is 100%.

18. The method of claim 15, wherein the predetermined interval is 1%.

19. The method of claim 15, wherein the first predetermined interval is between 1.25 and 1.5 times the second predetermined interval.

20. The method of claim 15, wherein the first predetermined interval is between 250 and 300 ms and the second predetermined interval is 200 ms.

21. The method of claim 15, further comprising:
   resetting at least one fault code prior to throttle sweep testing; and
   generating a wiring fault when the at least one fault code is generated again before the throttle sweep testing begins.

* * * * *

UNITED STATES PATENT AND TRADEMARK OFFICE
Certificate

Patent No. 8,225,646 B2

Patented: July 24, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Paul A. Bauerle, Fenton, MI (US); Marco J. Gatti, Southgate, MI (US); Dean G. Sorrell, Rochester Hills, MI (US); Todar Kuzmanov, Troy, MI (US); David B. Miller, Sterling Heights, MI (US); and D. Michael Claypoole, Walled Lake, MI (US).

Signed and Sealed this Twenty-third Day of July 2013.

LUAN VAN
*Supervisory Patent Examiner*
Art Unit 1759
Technology Center 1700